US008688367B2

(12) United States Patent
Mauderer (10) Patent No.: US 8,688,367 B2
(45) Date of Patent: Apr. 1, 2014

(54) STORAGE AND VISUALIZATION OF POINTS OF INTEREST IN A NAVIGATION SYSTEM (75) Inventor: Hans Peter Mauderer, Gaggenau (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 1848 days.

(21) Appl. No.: 11/726,394

(22) Filed: Mar. 21, 2007

(65) Prior Publication Data

US 2008/0027632 A1  Jan. 31, 2008

(30) Foreign Application Priority Data

Mar. 28, 2006  (EP) .................................... 06006441

(51) Int. Cl.
G01C 21/00 (2006.01)

(52) U.S. Cl.
USPC .......................................... 701/409; 340/988

(58) Field of Classification Search
USPC ..................... 701/23–25, 200–201, 206–216, 701/300–302, 400, 408–410, 424–426, 438, 701/450; 342/350, 352, 355–356, 450–451, 342/457–458, 463–465; 340/988–994
See application file for complete search history.

(56) References Cited

U.S. PATENT DOCUMENTS

| | | | |
|---|---|---|---|
| 6,259,381 B1 * | 7/2001 | Small | 340/988 |
| 6,321,158 B1 | 11/2001 | DeLorme et al. | |
| 6,587,782 B1 | 7/2003 | Nocek et al. | |
| 7,054,743 B1 * | 5/2006 | Smith | 701/209 |
| 7,394,405 B2 * | 7/2008 | Godden | 340/996 |
| 7,640,104 B2 * | 12/2009 | Ramaswamy et al. | 701/213 |
| 7,715,981 B2 * | 5/2010 | Bradley et al. | 701/209 |
| 2004/0078813 A1 | 4/2004 | Kobuya et al. | |

FOREIGN PATENT DOCUMENTS

| | | |
|---|---|---|
| EP | 1 102 037 A1 | 5/2001 |
| EP | 1 480 011 A1 | 11/2004 |
| JP | 03140816 | 6/1991 |
| JP | 2002296052 | 10/2002 |
| JP | 2006064671 | 3/2006 |

* cited by examiner

Primary Examiner — Dalena Tran
(74) Attorney, Agent, or Firm — O'Shea Getz P.C.

(57) ABSTRACT

A navigation system accepts driver input that extends the navigation capabilities of the navigation system, while permitting the driver to navigate using a digital map that indicates vehicle position. The driver input may identify a new point of interest, an icon for the new point of interest, and location information for the new point of interest. The navigation system supplements a pre-configured navigation database with the driver input. During a subsequent trip, when the vehicle approaches the new point of interest, the navigation system alerts the driver of the new point of interest.

24 Claims, 10 Drawing Sheets

STORAGE AND VISUALIZATION OF POINTS OF INTEREST IN A NAVIGATION SYSTEM

PRIORITY CLAIM

This application claims the benefit of priority from European Patent Application No. 06 006 441.7, filed Mar. 28, 2006, which is incorporated by reference.

BACKGROUND OF THE INVENTION

1. Technical Field

This disclosure relates to route guidance by a navigation system and a navigation system for a vehicle or a hand-held device. In particular, this disclosure relates to the storage and presentation of points of interest along the route.

2. Related Art

Navigation systems have become standard equipment in many vehicles. Such systems typically receive GPS (Global Positioning System) satellite radio signals, which are received by a GPS antenna of the vehicle. The signals are provided to a navigation computer in the vehicle. The navigation computer processes the received GPS data, and may also process supplemental data, to determine the current position of the vehicle. The supplemental data may include data obtained from motion sensors, wheel sensors and gyroscopes, and other data.

Navigation systems typically use electronic maps to represent cartographic features, such as streets, buildings and geographical features. The electronic maps are usually stored on a compact disc or a digital video disc. Once the navigation system performs map matching, the current position of the user is indicated on the displayed digital map. The user is guided to a predetermined destination by audio and/or video output.

Some navigation systems display detailed digital maps and/or three-dimensional detailed views indicating routes to predetermined destinations. Such systems may indicate the types of driving maneuvers to be taken at various junctions, and may also indicate different points of interest (POIs). Such points of interest may include service stations, museums, hotels, restaurants, landmarks, and the like.

To provide the required navigation functions, navigation systems use one or more detailed map databases. The databases may include bitmap images for lanes, signpost information, landmarks, and the like. The databases may also include data for representing the physical features of a geographic region and POIs.

However, existing navigation systems only provide the driver with standardized non-individualized information or with a preset customized route. The systems cannot be manipulated by the user to add new POIs once the trip has begun. The systems cannot be adapted to the individual needs of the user in route. Therefore, a need exists for a navigation system that can be individually customized by the user in route.

SUMMARY

A navigation system permits a driver to navigate using a digital map, which indicates the position of the vehicle relative to the map. The navigation system also displays various POIs using icons, graphic indicia and/or alphanumeric indicators. An audio indicator may also be issued to alert the driver regarding an approaching point of interest. The navigation system also allows the driver to enter a new point of interest while in route. The coordinates of the new point of interest and an icon selected by the driver corresponding to the new point of interest are saved in a database. During a subsequent trip, when the driver approaches the previously saved point of interest, the navigation system may alert the driver of the approaching point of interest.

The navigation system may save the icon representing the new point of interest in the database along with the corresponding location of the user while in route. However, the user is not restricted to only saving new points of interest corresponding to the user's present position. The user may also select a new point of interest and save it along with an arbitrary location corresponding to a selected position on the digital map. The arbitrary location and corresponding new point of interest may relate to a point of interest that the user recalls at a later time and wishes to save in the database.

Further, the navigation system may save multiple POIs in the database, and similar POIs may be organized into a class of points of interest. The navigation system may also save multiple classes of points of interest while the user is navigating.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The navigation system may be better understood with reference to the following drawings and description. The components in the figures are not necessarily to scale, emphasis instead being placed upon illustrating the principles of the invention. Moreover, in the figures, like-referenced numerals designate corresponding parts throughout the different views.

DETAILED DESCRIPTION OF THE PREFERRED EMBODIMENTS

Figure 1:
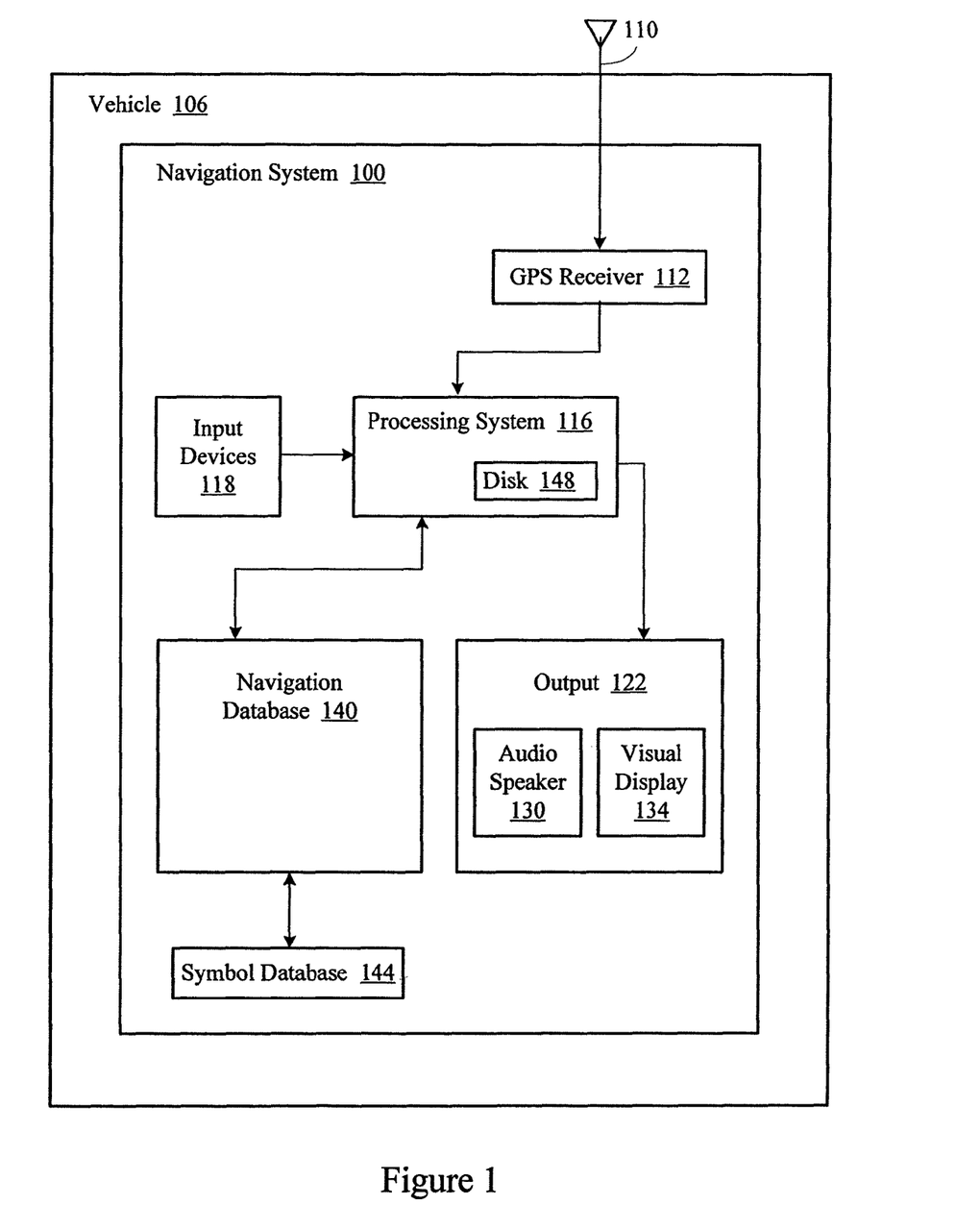
FIG. 1 shows a navigation system.

FIG. 1 shows a navigation system 100. The navigation system 100 may be installed in a vehicle 106, such as an automobile, motorcycle, ship, or airplane. The navigation system 100 may include a GPS antenna 110, typically mounted on the vehicle, and a GPS receiver 112 configured to receive the GPS signals from the antenna. The navigation system 100 may include a processing system 116 connected to the GPS receiver. The processing system 116 may receive user input from various input devices 118, and may output information on various output devices 122, such as an audio speaker 130 and a visual display 134. The processing system 116 may also be coupled to a navigation or map database 140, which may provide the user with the basic map or route. The navigation database 140 may be in turn coupled to a symbol database 144. The navigation system 100 may store computer-executable program instructions and data on a disk 148 and/or may contain non-volatile memory for such storage.

Figure 2:
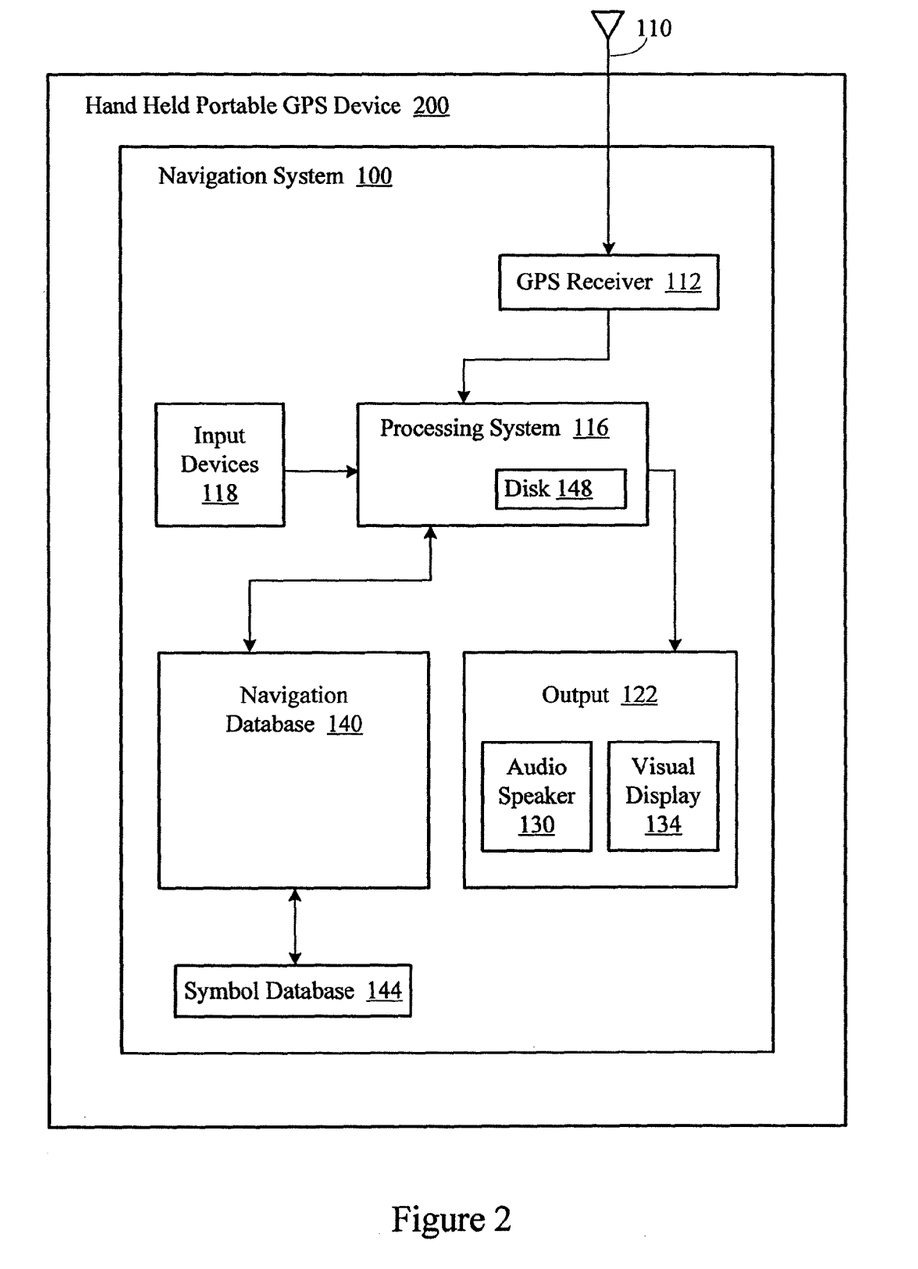
FIG. 2 shows a hand-held navigation system.

The navigation system 100 may also be self-contained in a hand-held portable device. FIG. 2 shows such a hand-held portable GPS device 200. In other words, the navigation systems described below are not limited in application to vehicles, but may have many different implementations.

Figure 3:
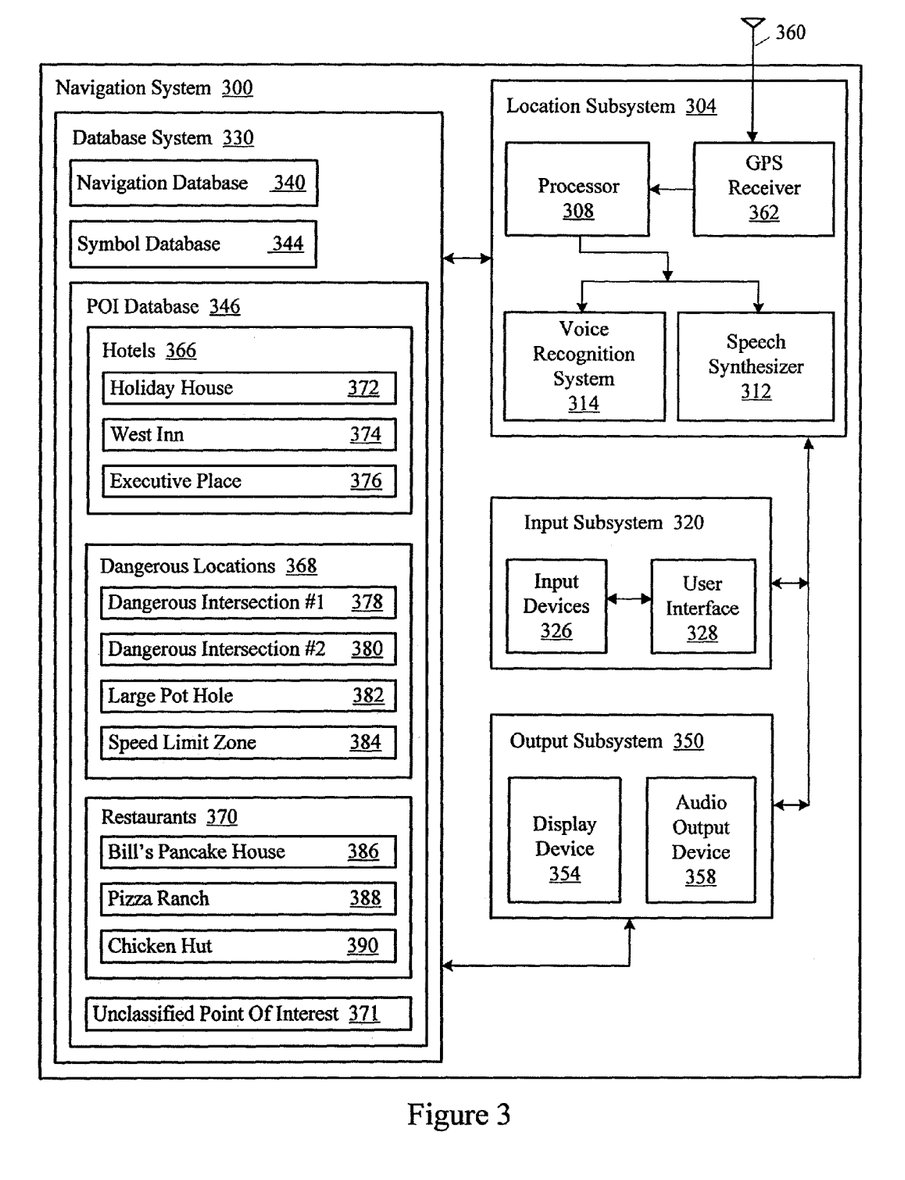
FIG. 3 illustrates another aspect of a navigation system.

FIG. 3 shows a navigation system 300 that includes a location subsystem 304. The location subsystem 304 may include a processor 308, a speech synthesizer 312, and a voice recognition system 314.

The navigation system 300 may also include an input subsystem 320 with input devices 326 and a user interface 328. The user may operate the input subsystem 320 through the user interface 328. The input subsystem 320 may include input devices 326 through which the user interacts with the navigation system 300. Additionally, multiple databases or a database system 330 may be coupled to the location subsystem 304. The database system 330 may include a main database or navigation database 340, a symbol database 344 and a dynamic point of interest and class database 346 (POI database). The navigation database 340 may provide the user with the basic map or route to be displayed. The location subsystem 304 may be coupled to the input subsystem 320 and to an output subsystem 350. The output subsystem 350 may include a display device 354 and an audio output device 358. The navigation system 300 may also include a speech synthesizer 312 and a voice recognition system 314. The speech synthesizer 312 and the voice recognition system 314 may be logic implemented in the input subsystem 320, the output subsystem 350, or elsewhere in the navigation system 300. Alternatively, the speech synthesizer 312 and a voice recognition system 314 may be separate from the components described.

The location subsystem 304 may include a GPS antenna 360 and a GPS receiver 362. The GPS receiver 362 may determine an actual position at which the navigation system or vehicle is currently located. To facilitate user control, the location subsystem 304 may also receive instructions from the voice recognition system 314. The voice recognition system 314 may detect and recognize spoken language, including audible commands and input parameters. The voice recognition system 314 may be configured to recognize a large library of words and phrases. The voice recognition system 314 may be a commercially available voice recognition system coupled to the navigation system 300 or may be an embedded application. The voice recognition system 314 may be activated by a push-to-talk lever or other suitable input devices 326. Alternatively, the voice recognition system 314 may be located in or be part of the input subsystem 320. The voice recognition system 314 may be omitted, and the input devices 326 may provide all necessary commands to the navigation system 300. The speech synthesizer 312 may also be coupled to or contained within the location subsystem 304. The speech synthesizer 312 may produce synthesized speech that may provide navigation information to the user. The navigation information may include waypoint distance, waypoint identification, identification of POIs, and warnings or messages.

The navigation database 340, the symbol database 344 and the POI database 346 may be coupled to each other within the database system 330, and may be further coupled to the location subsystem 304. The database system 330 may receive commands and signals from the location subsystem 304. The navigation database 340, the symbol database 344 and the POI database 346 may cooperate to output map and coordinate information and POI information to the display device 354. The POI database 346 may contain various POIs and/or various classes of points of interest. POI database 346 may be dynamically updated and new entries may be saved or deleted at any time. A POI may be a subset within a class of points of interest, or may be independent. The navigation database 340 may be a preexisting or pre-prepared database that may include part or all of the data used for route guidance. The actual or physical location of various POIs may be stored in the POI database 346 or the symbol database 344 by storing an indicia, e.g., a symbol or icon, associated with the points of interest. The coordinates of the actual position of the vehicle may also be stored in the POI database 346. The database system 330 may be configured so that it can be updated after being purchased by a user or installed in the navigation system. Alternatively, the database system 330 may be a supplementary database that may be used with the various databases configured to perform route guidance. Both types of databases may physically reside in magnetic, optical or other suitable storage media.

FIG. 3 shows various POIs residing in the POI database 346. The class associated with the POIs are also contained in the POI database 346. However, the classes of POIs and the POIs may alternatively reside in the navigation database 340, the symbol database 344 or any other memory in the navigation system 300. Any suitable number of classes of points of interest and any number of points of interest within a class may be included in the POI database 346. The amount of data is limited only by the storage size that may be allocated to those entries. For example, the POI database 346 may include four classes of points of interest, namely Hotels 366, Dangerous Locations 368, Restaurants 370 and Unclassified POIs 371. The Hotel class 366 may include the POIs identified as Holiday House 372, West Inn 374 and Executive Place 376. The Dangerous Locations class 368 may include the points of interest identified as Dangerous Intersection #1 378, Dangerous Intersection #2 380, Large Pot Hole 382 and Speed Limit Zone 384. The Restaurant class 370 may include the POIs identified as Bill's Pancake House 386, Pizza Ranch 388 and Chicken Hut 390. All of the POIs are associated with or are linked to their corresponding coordinates. The classes, the POIs and their associated coordinates may be saved as folders, tables, graphs, links, and/or data structures. Any suitable data construct in the database system 330 may be used.

As described above, the database system 330 may be configured to store and retrieve icons or symbols for classes of POIs and individual POIs. The symbols may be located in the navigation database 340 or in a separate symbol database 344. In either configuration, the databases of the database system 330 may be modified and updated by the user either before an excursion or trip, during an excursion or trip, or after an excursion or trip. Each icon may be a symbol representing a point of interest or its class. The icons may be textual or graphic information, such as letters or alphanumeric data. Such icons or symbols may also be in the form of digital photographs ("thumbnail photos"), bitmaps, vector graphics, and the like. Vector graphic representations may be particularly suitable for calculating and displaying symbols, including three-dimensional symbols, and may have favorable scaling and storage space characteristics in comparison to other representations.

New symbols may be added to the navigation database 340 or the symbol database 344, and previously stored or existing symbols may be deleted or modified. This may occur before, during, or after navigation. New symbols may be created by the user. Symbols that are assigned, selected or designed by the user in accordance with his or her preferences enhance the "look and feel" of the output display. The enhanced output display improves the navigation experience. Alternatively, the user may download new symbols, e.g., via the Internet, and store the new symbols in the symbol database 344.

The output subsystem 350 may include various output devices, such as the audio output device 358 or speaker. The output subsystem 350 may also include the display device 354, such as an LCD display. Any suitable display device may be used. The display device 354 and the audio output device 358 may be arranged to indicate one or more points of interest. The points of interest may be stored in the POI database 346 based on the present location of the vehicle. The display device 354 may display various digital maps, including the symbols representing points of interest.

Figure 4:
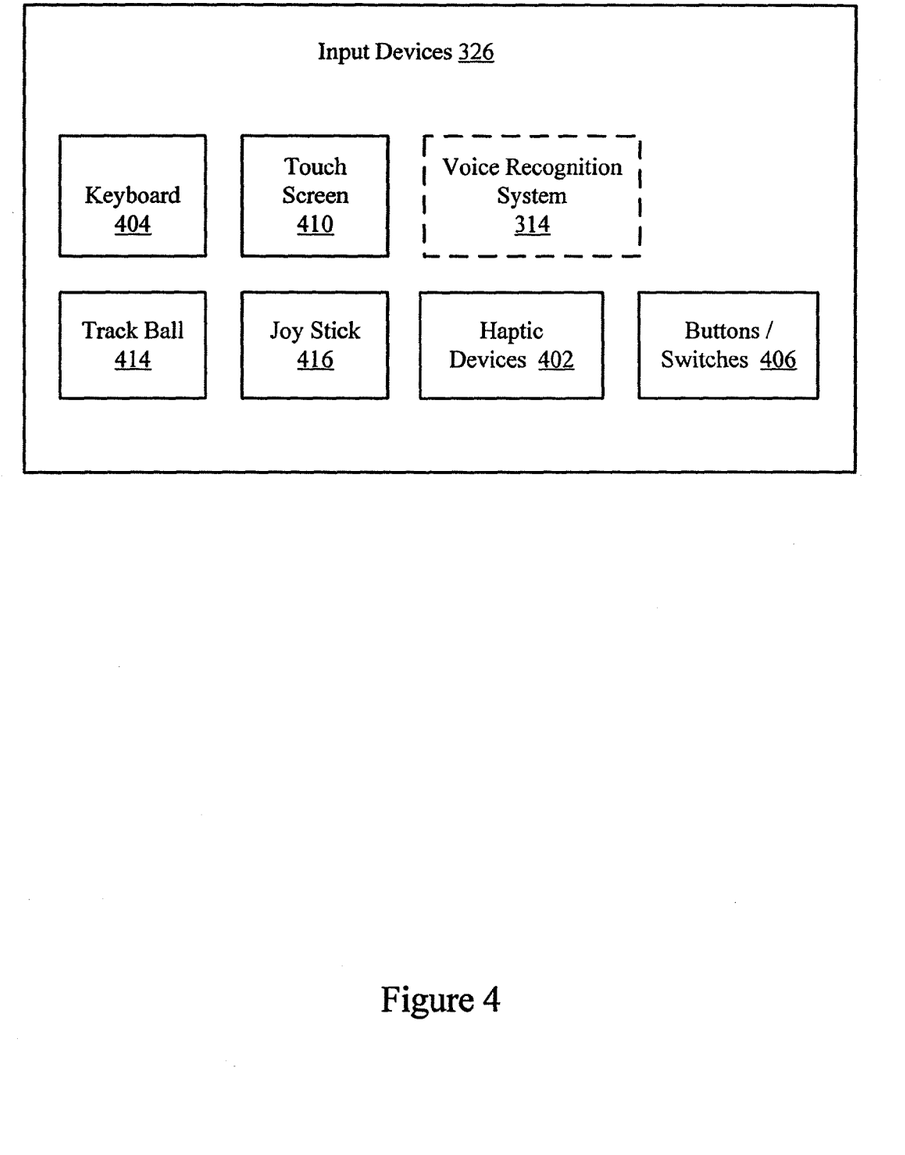
FIG. 4 shows an input subsystem of a navigation system.

FIG. 4 shows the input devices 326 of input subsystem 320 in greater detail. The input devices 326 may include haptic devices 402, which may incorporate or employ tactile sensation processing, reporting, or feedback. The input devices 326 may also include a keyboard 404 and various buttons and switches 406. The input devices 326 permit the user to operate the navigation system 300. The input devices 326 may further include a touch screen 410, a track ball 414, a joystick 416 and the like. Alternatively, the voice recognition system 314, shown in dashed lines, may be logically included in the input devices 326.

Figure 5:
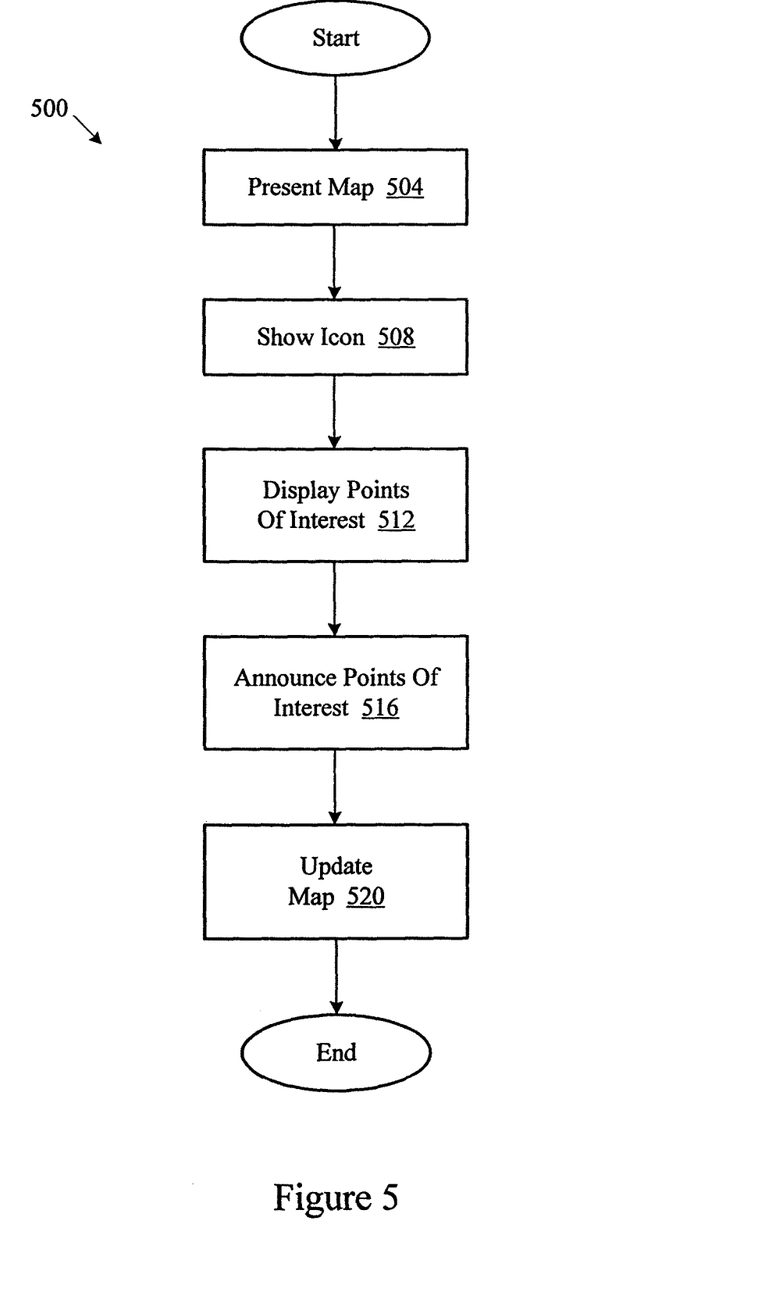
FIG. 5 is a flow diagram showing acts taken during navigation.

FIG. 5 shows acts 500 that the navigation system 300 may take in operation when a driver uses the navigation system. The navigation system 300 may present a map on the display device (Act 504). The navigation system 300 may also show an icon representing the vehicle at a convenient point on the map, for example toward a lower portion of the map (Act 508). Also, various POIs may be displayed (Act 512) on the display device and/or may be announced (Act 516) to the user via the audio output device. As the vehicle travels, the map display may be updated (Act 520). The icon representing the vehicle tends to remain at the same location on the display. The map may move relative to the vehicle icon to indicate relative movement of the vehicle. However, the display may be continuously updated to provide the driver with a display of the moving vehicle relative to the map.

Figure 6:
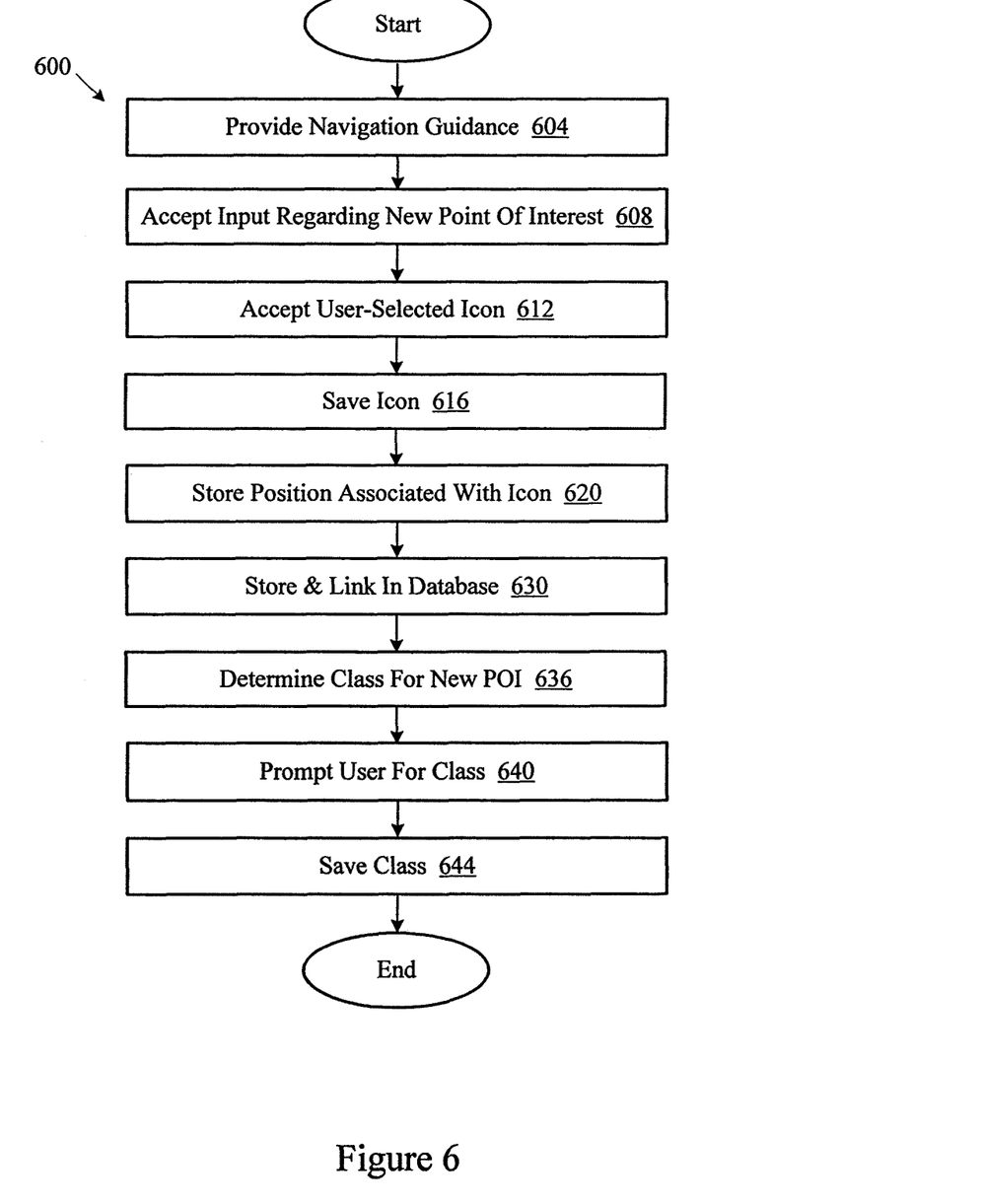
FIG. 6 is a flow diagram showing acts that the navigation system may take when a driver notes a new point of interest during navigation.

FIG. 6 shows acts 600 that the navigation system 300 may take to capture a new point of interest and thereby extend the navigation capabilities supported by a pre-configured navigation database. The navigation system 300 may provide navigation guidance to the user (Act 604). During navigation, the navigation system 300 may accept user input indicating that the user has identified a new point of interest (Act 608). The new point of interest may be accepted while the driver navigates. The user may notice or may be interested in various POIs not initially included in the navigation database 340, and thus not presented on the digital map. Of course, the user need not be in a vehicle at the time, and may be a pedestrian using a hand-held version of the navigation system (FIG. 2). The user may want to include such new pertinent POIs in the POI database 346 for later use. The points of interest can relate to almost any item of information. For example, the user may want to store as a new point of interest a new type of restaurant, a location of a friend's house, or the location of a dangerous intersection and the like. To save such new POIs on demand during navigation, the navigation system 300 may accept a user-selected icon to represent the new point of interest (Act 612). The user may use any of the available input devices, such as the switches, a display screen cursor or may use voice input. Next, the navigation system 300 may store the selected icon (Act 616). The navigation system 300 may store the icon or symbol along with the actual location of the vehicle (Act 620) so that the icon is associated with the location of the new point of interest. The navigation system 300 may update the POI database 346 dynamically at any time. The navigation system 300 may store both the icon and the associated location or link in the database (Act 630).

Next, the navigation system 300 may determine the class associated with the new POI (Act 636). The navigation system 300 may request the user to identify the class to be 5 associated with the new POI (Act 640). The speech synthesizer 312 may output instructions requesting that the user enter an associated class. After the user has selected the associated class, the class may be saved in the POI database 346 (Act 644). If the user fails to select a class, the navigation system 300 may select or assign a class to the new POI. The assignment may be made using heuristic matching or pattern matching techniques.

Figure 7:
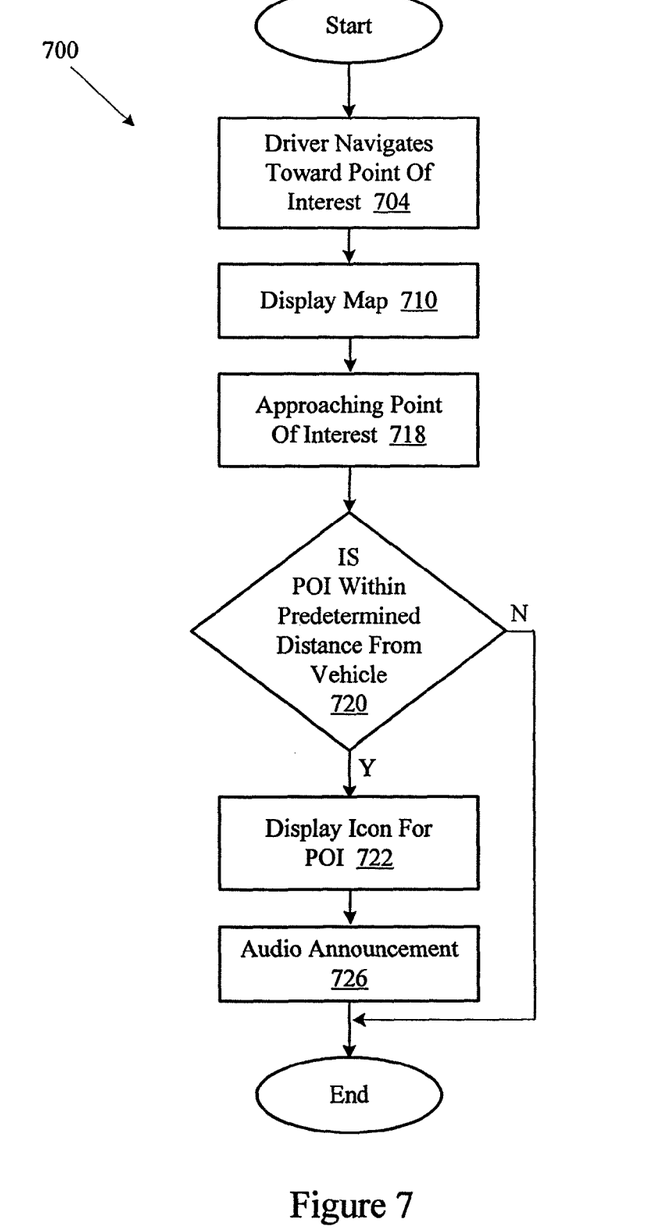
FIG. 7 is a flow diagram showing acts that the navigation system may take when a driver navigates near a point of interest.

FIG. 7 shows acts 700 corresponding to route guidance on a subsequent trip. The subsequent trip may happen to take the user to within a predetermined distance from one or more POIs stored in the POI database 346 (Act 704). The map and icon of the vehicle may be displayed (Act 710) during the trip. However, during this trip, the navigation system 300 may display the previously stored class of points or interest or the points of interest saved by the user. The navigation system 300 may display the point of interest or its class when the vehicle approaches (Act 718) the physical location of the point of interest. The navigation system 300 may determine whether the vehicle is within a pre-selected distance from the point of interest before displaying the point of interest (Act 720). The distance may be measured by the location subsystem. The pre-selected distance or range may be preprogrammed or may be selected by the user. Alternatively, the pre-selected distance may vary depending upon the speed of the vehicle and may be calculated to provide the driver with sufficient warning of the approaching point of interest.

The navigation system 300 may display the point of interest when the vehicle is within range (Act 722). The navigation system 300 may also verbally announce the point of interest to the user via the audio output device (Act 726). The navigation system 300 may implicitly indicate the position of the point of interest by positioning the icon or symbol at the correct place in a digital map. The navigation system 300 may also expressly indicate the point of interest by announcing or displaying the actual distance between the point of interest and the vehicle.

Figure 8:
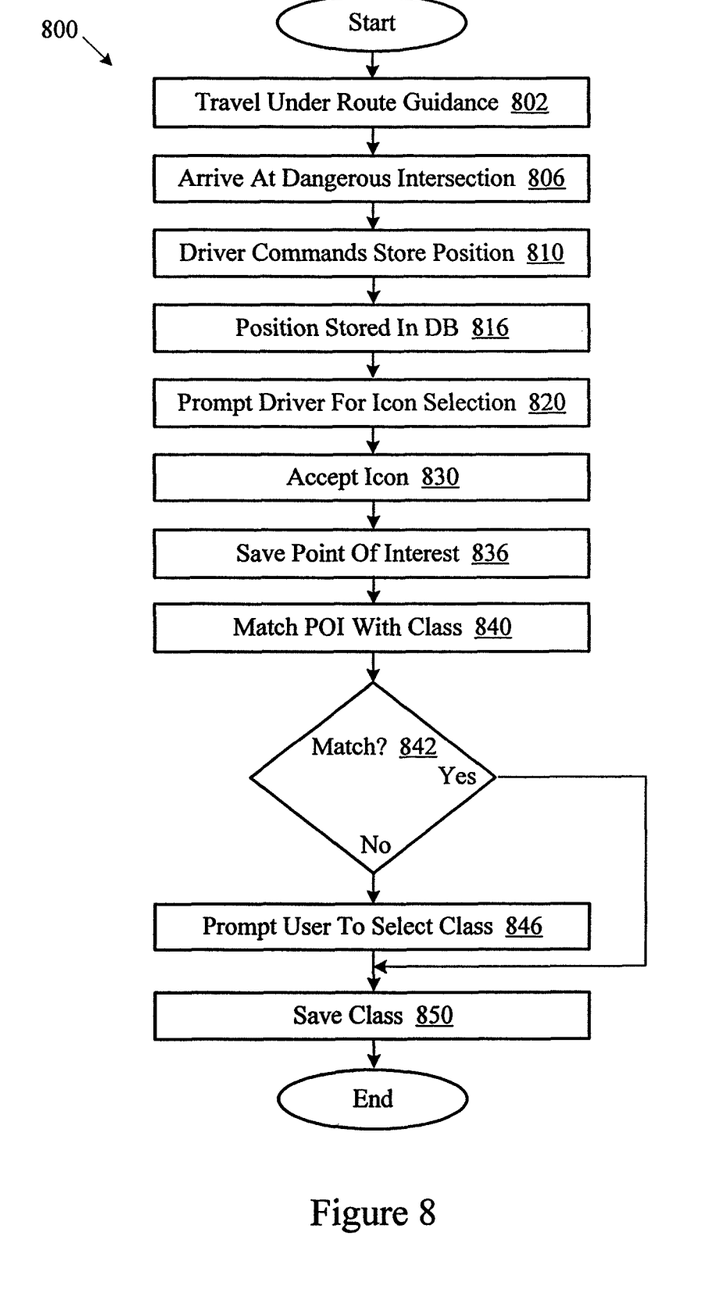
FIG. 8 is a flow diagram showing acts that the navigation system may take when a driver notes a dangerous intersection.

FIG. 8 shows acts 800 that the navigation system 300 may take to store a new class of POIs identified as Dangerous Locations. The navigation system 300 may provide navigation assistance to the driver of the vehicle (Act 802). After some time the driver may arrive at an intersection he considers to be dangerous (Act 806). The driver may then press a push-to-talk button and may utter the phrase "Store Position!" (Act 810). The voice recognition system 314 may recognize the spoken command and store the actual position of the vehicle in the database, in the form of appropriate coordinates (Act 816). The speech synthesizer may output the phrase "Position Stored-Point of Interest?" This may prompt the driver (Act 820) to input or select the icon or symbol corresponding to the point of interest. The driver may select the icon from a list of symbols representing various POIs. The navigation system 300 may accept the icon or symbol entered by the driver for this particular point of interest (Act 830). The accepted point of interest may correspond to what the driver considers to be a dangerous intersection. The navigation system 300 may then save the point of interest (Act 836) in the POI database 346.

The navigation system 300 may recognize that the new POI belongs to a particular class. The navigation system 300 may match the new POI with an existing class (Act 840). If no match is found (Act 842), the navigation system 300 may prompt the user to select an appropriate class (Act 846). The class may then be saved in the POI database 346 (Act 850).

Alternatively or additionally, to identify this point of interest, the driver may utter a pre-determined phrase, e.g., "New Point of Interest," "Dangerous Intersection," or other phrase. The voice recognition system may digitize this sample of speech. The processor may generate a link or store the digitized audio sample in a library. The navigation system 300 may save the speech sample for later output as "Attention! Dangerous Intersection!" The word "Attention" may be generated or created by the navigation system 300 rather than by the user. Furthermore, the navigation system 300 may store the user-generated or user-selected symbol representing the dangerous intersection in the symbol database 344. The coordinates of the dangerous intersection may be stored in the POI database 346. The point of interest and its coordinates may be associated with or linked to each other in the database. The symbol may also be an external symbol previously generated or prepared and/or selected by the user. For example, the symbol may be based on a digital photograph or a downloaded vector graphic file. This symbol may reside in any of the databases.

Figure 9:
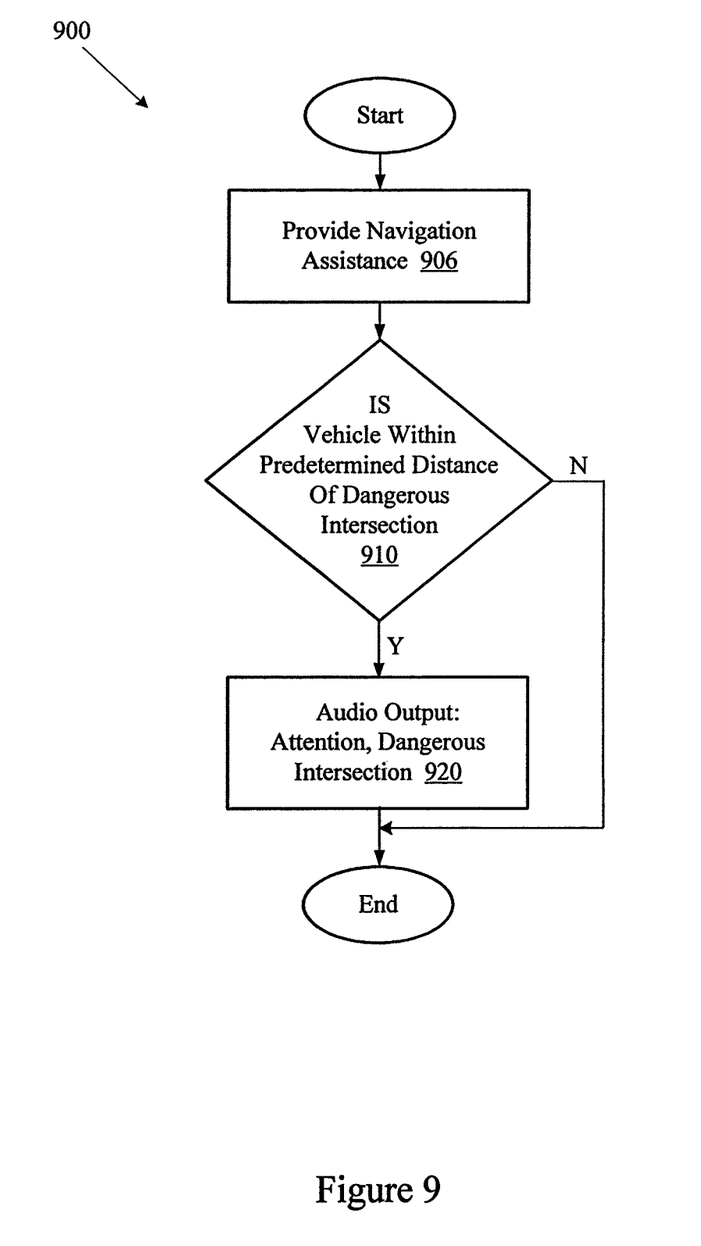
FIG. 9 is a flow diagram showing acts that the navigation system may take when a driver encounters the dangerous intersection, which was previously stored.

FIG. 9 shows acts 900 taken by the navigation system 300 while the driver navigates at a later time and approaches a point of interest. The navigation system 300 may provide navigation assistance while the driver approaches the intersection (Act 906). The navigation system 300 may determine when the driver is within a predetermined range or distance of the point of interest, in this case, the dangerous intersection (Act 910). The navigation system 300 may activate the speech synthesizer when the driver is within the predetermined range of the point of interest. The speech synthesizer 312 may output the following phrase: "Attention! Dangerous Intersection!" (Act 920). This informs the driver that he is approaching the dangerous intersection, which was previously entered into the navigation system 300. The speech synthesizer 312 may output the previously digitized sample of the driver's speech.

The location subsystem may determine the actual distance to the coordinate position of the point of interest corresponding to the dangerous intersection. The position of the vehicle may be continuously monitored during travel. When the vehicle is within a predetermined distance from the point of interest, namely the dangerous intersection, the navigation system 300 makes the announcement. Alternatively, the warning may be in explicit form, such as "Attention! Dangerous Intersection! 100 meters." The speech recognition system and speech synthesis system may also be configured such that a speech sample can be recorded directly from the driver for subsequent output. Readable text may be displayed to the user corresponding to the voice output message.

As a further example, during navigation, the driver may recognize a particular hotel of interest during navigation, for example, a Holiday House hotel. If the driver utters the phrase "Store Holiday House," the navigation system 300 may store the actual position of the hotel (actual position of the vehicle). The navigation system 300 may also store the term "Hotels" as the class of the point of interest, as selected by the user. The navigation system 300 may store the new class, "Hotels," in the POI database 346, along with an associated link representing the coordinates of the actual position of the Holiday House hotel. For example, the new class, Hotels 366, and the new point of interest, the Holiday House 372, are shown in FIG. 3.

Figure 10:
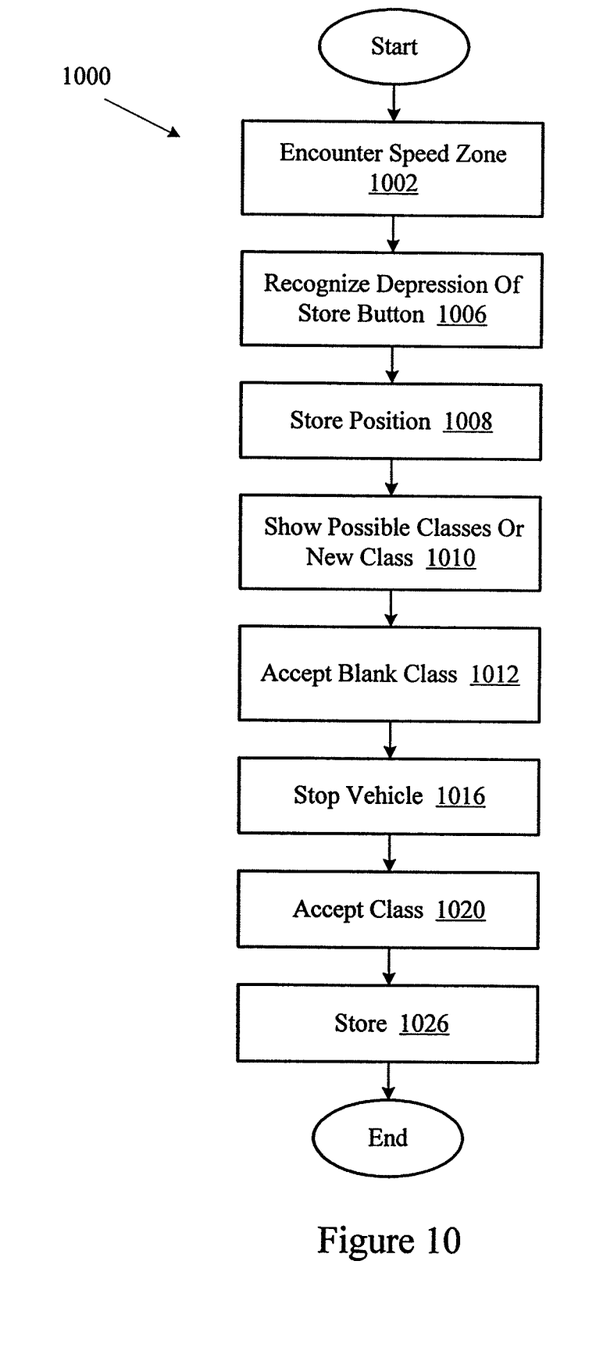
FIG. 10 is a flow diagram showing acts that the navigation system may take when a driver enters a new class of POIs.

FIG. 10 shows acts 1000 that the navigation system 300 may take should the driver encounter a hidden speed limit zone (Act 1002). The driver may depress a position storage button when he encounters the speed zone. The navigation system 300 may recognize when the driver depresses the button (Act 1006) and may immediately store the actual position of the vehicle (Act 1008), as determined by the location subsystem. Subsequently, the navigation system 300 may display symbols on the display (Act 1010) representing various possible classes of points of interest, such as Hotels, Restaurants and the like. The navigation system 300 may also display an unassigned or blank class entitled "New Class." Because the driver may not be able to immediately find a symbol indicating a speed limit zone, the navigation system 300 may accept driver input temporarily indicating selection of a new or blank class (Act 1012). The driver may then have occasion to stop, such as when at a traffic signal (Act 1016). Once stopped, the driver may have adequate time to enter or select the symbol for the "speed limit zone" under the class of "Dangerous Locations." The navigation system 300 may automatically detect when the vehicle has stopped, and then prompt the driver for the additional information. The navigation system 300 may then accept the new class entitled "Dangerous Locations" and the new point of interest entitled "Speed Limit Zone" selected by the driver (Act 1020). The navigation system 300 may then store the new class and the point of interest in the POI database 346 (Act 1026). For example, the new class, Dangerous Locations 368, and the associated point of interest, the Speed Limit Zone 384, are shown in FIG. 3.

The next time that the driver approaches the speed limit zone, the navigation system 300 may display the symbol for the class defined as "Dangerous Locations," and the point of interest defined as "speed limit zone." The navigation system 300 may also display identifying text along with an audio warning. Thus, the driver may be warned in advance of the approaching speed limit zone.

As described above, route guidance may be performed by providing audio and/or visual information to the user. The navigation system 300 may also display a digital map showing the present position of the vehicle. The navigation system 300 may also indicate the route to be taken, along with the icons or symbols for various points of interest and associated class. In particular, the digital map may include symbols representing points of interest that may be individually customized by the user and stored while in route. Additionally, the icon or symbol may change form (blinking, highlighted, change of shape, change of color and the like) when the vehicle approaches or reaches the point of interest within a predetermined distance. Further, the above-described hardware and software may be incorporated in a hand-held device with no operating or functional differences.

The POI database 346 may be updated with an actual point of interest and/or a class of points of interest, along with the corresponding position. However, a newly defined point of interest need not necessarily belong to any pre-defined class. Examples of classes of points of interest may include Hotels, Restaurants, Service Stations, Police Stations, and other classes. Specific POIs may belong to a defined class, such as the Hotels class, or the Museums class.

The user may also define a new class of points of interest while in route. For example, the user may define a class of POIs representing a particular type of establishment, such as a hardware store. The user may select (or design) the type of symbol to represent the store at hand. Thus, the navigation system 300 may be customized in accordance with the user's preferences while the driver is in route. Further, the navigation system 300 may be operated by another user, such as a passenger.

The navigation system 300 may use any suitable coordinate system to identify and store the POIs. Any suitable software technique may be employed to associate the point of interest with its coordinates, such as pointers, links, multi-dimensional arrays, tables and the like. Links from entries of predefined or user-defined symbols may be associated with libraries corresponding to stored positional data.

The navigation system 300 may also be configured to store an arbitrary coordinate position corresponding to the point of interest or class of points of interest. For example, while in route, the user may recall that he passed a dangerous intersection several miles back. The driver may not have had sufficient time to enter the data or even issue any commands at that time. Accordingly, after the event, the user may input the dangerous intersection as a point of interest. The user may then assign a symbol to represent the dangerous intersection and may place that symbol at an arbitrary location on the map. The arbitrary location, of course, corresponds to the position at which the driver recalls the dangerous intersection being located. Thus, the driver (and vehicle) need not be physically located at a particular location to enter and save a particular point of interest. The user may enter or select a symbol corresponding to the point of interest using a cursor in a drag-and-drop manner. Such a drag-and-drop method may permit the user to position the symbol at the desired arbitrary position in the digital map. Accordingly, the user is not restricted to customizing the navigation system 300 based on a present or actual position. The user may also store the coordinates of an arbitrary position and associated point of interest at any time during navigation.

The logic, circuitry, and processing described above may be encoded in a computer-readable medium such as a CDROM, disk, flash memory, RAM or ROM, an electromagnetic signal, or other machine-readable medium as instructions for execution by a processor. Alternatively or additionally, the logic may be implemented as analog or digital logic using hardware, such as one or more integrated circuits (including amplifiers, adders, delays, and filters), or one or more processors executing amplification, adding, delaying, and filtering instructions; or in software in an application programming interface (API) or in a Dynamic Link Library (DLL), functions available in a shared memory or defined as local or remote procedure calls; or as a combination of hardware and software.

The logic may be represented in (e.g., stored on or in) a computer-readable medium, machine-readable medium, propagated-signal medium, and/or signal-bearing medium. The media may comprise any device that contains, stores, communicates, propagates, or transports executable instructions for use by or in connection with an instruction executable system, apparatus, or device. The machine-readable medium may selectively be, but is not limited to, an electronic, magnetic, optical, electromagnetic, or infrared signal or a semiconductor system, apparatus, device, or propagation medium. A non-exhaustive list of examples of a machine-readable medium includes: a magnetic or optical disk, a volatile memory such as a Random Access Memory "RAM," a Read-Only Memory "ROM," an Erasable Programmable Read-Only Memory (i.e., EPROM) or Flash memory, or an optical fiber. A machine-readable medium may also include a tangible medium upon which executable instructions are printed, as the logic may be electronically stored as an image or in another format (e.g., through an optical scan), then compiled, and/or interpreted or otherwise processed. The processed medium may then be stored in a computer and/or machine memory.

The systems may include additional or different logic and may be implemented in many different ways. A controller may be implemented as a microprocessor, microcontroller, application specific integrated circuit (ASIC), discrete logic, or a combination of other types of circuits or logic. Similarly, memories may be DRAM, SRAM, Flash, or other types of memory. Parameters (e.g., conditions and thresholds), and other data structures may be separately stored and managed, may be incorporated into a single memory or database, or may be logically and physically organized in many different ways. Programs and instruction sets may be parts of a single program, separate programs, or distributed across several memories and processors. The systems may be included in a wide variety of electronic devices, including a cellular phone, a headset, a hands-free set, a speakerphone, communication interface, or an infotainment system.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

I claim:

1. A method for navigation, comprising at least one processor for performing the steps of:
    displaying a digital map on a display device;
    displaying an indication of a location of a user on the digital map;
    saving a representation of a point of interest during a first excursion in response to user selection of the point of interest from a class of points of interest displayed on the display device such that the point of interest is associated with the class, the representation adapted for display on the digital map;
    determining whether the class is saved;
    saving the class automatically as a new class of points of interest in response to a determination that the class is not saved such that the new class of points of interest is selectable for association with a subsequent point of interest; and
    providing to the user on the digital map and during a second excursion the representation of the point of interest saved during the first excursion.

2. The method according to claim 1, where the representation of the point of interest corresponds to a present location of the user.

3. The method according to claim 1, where the representation of the point of interest corresponds to an arbitrary location in the digital map selected by the user.

4. The method according to claim 1, where the representation of the point of interest is selected by the user and saved by the user during navigation.

5. The method according to claim 1, where the representation of the point of interest is provided to the user if the user is within a predetermined distance of the point of interest.

6. The method according to claim 1, where the representation of the point of interest is associated with a location and is saved in a database.

7. The method according to claim 6, where the database further includes a navigation database and a symbol database.

8. The method according to claim 1, where the representation of the point of interest is an icon displayed on the digital map, the icon being based on a digital photograph, a bitmap and/or a vector graphic.

9. The method according to claim 1 further comprising providing an indication to the user where the indication is provided in a form selected from the group consisting of audio tones, verbal messages, and visual indicia.

10. The method of claim 1 where the class is automatically saved as the new class of points of interest while in route during the first excursion.

11. A computer-readable storage medium having processor executable instructions to provide navigation to a user by performing the acts of:
displaying a digital map on a display device;
displaying an indication of a location of the user on the digital map;
saving a representation of a point of interest during a first excursion in response to user selection of the point of interest from a class of points of interest displayed on the display device such that the point of interest is associated with the class, the representation adapted for display on the digital map;
determining whether the class is saved;
saving the class automatically as a new class of points of interest in response to a determination that the class is not saved such that the new class of points of interest is selectable for association with a subsequent point of interest; and
providing to the user on the digital map and during a second excursion the representation of the point of interest saved during the first excursion.

12. The computer-readable storage medium of claim 11 further comprising processor executable instructions to cause a processor to perform the act of saving the representation of the point of interest associated with a present location of the user.

13. The computer-readable storage medium of claim 11 further comprising processor executable instructions to cause a processor to perform the act of saving the representation of the point of interest associated with an arbitrary location in the digital map, the arbitrary location selected by the user during navigation.

14. The computer-readable storage medium of claim 11 further comprising processor executable instructions to cause a processor to perform the act of saving the representation of the point of interest selected by the user during navigation.

15. The computer-readable storage medium of claim 11, further comprising processor executable instructions to cause a processor to perform the act of providing the representation of the point of interest if the user is within a predetermined distance of the point of interest.

16. The computer-readable storage medium of claim 11, further comprising processor executable instructions to cause a processor to perform the act of saving the representation of the point of interest in a database along with an associated location.

17. The computer-readable storage medium of claim 11, further comprising processor executable instructions to cause a processor to perform the act of displaying on the digital map the representation of the point of interest as an icon, the icon based on a digital photograph, a bitmap and/or a vector graphic.

18. A computer-readable storage medium having processor executable instructions to provide navigation to a user by performing the acts of:
displaying a digital map on a display device;
displaying an indication of a location of the user on the digital map;
saving, in a database during a first excursion, a representation of a point of interest corresponding to a present location of the user, the representation of the point of interest selected by the user from a listing of points of interest displayed on the display device during the first excursion, the representation of the point of interest adapted for display on the digital map;
associating a class with the point of interest;
determining whether the class is saved in the database;
saving the class in the database automatically as a new class of points of interest in response to a determination that the class is not saved in the database such that the new class of points of interest is selectable for association with a subsequent point of interest; and
providing to the user on the digital map and during a second excursion the representation of the point of interest saved during the first excursion if the user is within a predetermined distance of the point of interest.

19. A navigation system comprising:
a location subsystem configured to determine an actual position of the navigation system;
a database;
a processing subsystem coupled to the location subsystem and the database, and configured to receive information from an input subsystem;
the processing subsystem configured to store in the database a point of interest and an actual position associated with the point of interest, where the point of interest is selected by the user from a class of points of interest displayed on a display device such that the point of interest is associated with the class and where the point of interest is stored during navigation of a first portion of a trip;
the processing subsystem further configured to determine whether the class associated with the point of interest is saved in the database and, in response to a determination that the class is not saved in the database, to automatically save the class in the database as a new class of points of interest such that the new class of points of interest is selectable for association with a subsequent point of interest; and
an output interface operable to deliver a digital map and a representation of the point of interest on the digital map during a second portion of a trip if the user is within a predetermined distance of the point of interest.

20. The navigation system according to claim 19, where the input subsystem includes components selected from the group consisting of a haptic device, keyboard, touch screen, switch, button, and voice command system.

21. The navigation system according claim 19, further including a symbol database configured to store a symbol representing the point of interest and/or a class of points of interest, the symbol selected by the user and stored in the symbol database during navigation.

22. The navigation system according to claim 19, where the representation of the point of interest in the digital map is based on a digital photograph, a bitmap and/or a vector graphic.

23. The navigation system according to claim 19, where the representation of the point of interest corresponds to a present location of the user.

24. The navigation system according to claim 19, where the representation of the point of interest corresponds to an arbitrary location in the digital map selected by the user during navigation.

\* \* \* \* \*